(12) United States Patent
Fallas

(10) Patent No.: US 6,874,615 B2
(45) Date of Patent: Apr. 5, 2005

(54) CONVEYOR CHUTE

(76) Inventor: David M Fallas, 3120 Inverness Dr., Waco, TX (US) 76710

( * ) Notice: Subject to any disclaimer, the term of this patent is extended or adjusted under 35 U.S.C. 154(b) by 0 days.

(21) Appl. No.: 10/456,996

(22) Filed: Jun. 6, 2003

(65) Prior Publication Data
US 2004/0245070 A1 Dec. 9, 2004

(51) Int. Cl.⁷ .............................................. B65G 47/28
(52) U.S. Cl. ................... 198/459.8; 198/434; 198/435; 198/604; 198/605
(58) Field of Search ................................ 198/408, 604, 198/607, 459.8, 434, 435, 605; 193/25 R, 2 D

(56) References Cited

U.S. PATENT DOCUMENTS

| | | |
|---|---|---|
| 1,388,668 A | 8/1921 | Schumacher |
| 1,766,573 A | 6/1930 | Westin |
| 2,235,725 A | 3/1941 | Nordquist |
| 2,443,952 A | 6/1948 | Gilbert |
| 2,597,069 A | 5/1952 | Conti |
| 2,788,113 A | 4/1957 | De Waal |
| 2,849,116 A | 8/1958 | Fried |
| 2,905,310 A | 9/1959 | Stoeckel et al. |
| 2,941,676 A | 6/1960 | Harker |
| 2,948,417 A | 8/1960 | Haanes |
| 2,956,384 A | 10/1960 | Underwood |
| 3,022,620 A | 2/1962 | Gallet |
| 3,224,549 A | 12/1965 | Cella et al. |
| 3,319,767 A | 5/1967 | Breternitz et al. |
| 3,389,906 A | 6/1968 | Walton |
| 3,445,980 A | 5/1969 | Salomon |
| 3,481,465 A | 12/1969 | Way |
| 3,488,917 A | 1/1970 | Oswald et al. |
| 3,512,336 A | 5/1970 | Rosecrans |
| 3,575,276 A | 4/1971 | Rupert |
| 3,590,972 A | 7/1971 | Mosterd |
| 3,614,853 A | 10/1971 | Seragnoli |
| 3,673,756 A | 7/1972 | Prete et al. |
| 3,673,759 A | 7/1972 | Ayres et al. |
| 3,680,395 A | 8/1972 | Douglas |
| 3,685,631 A | 8/1972 | Harris |
| 3,705,001 A * | 12/1972 | Lingg et al. ................. 198/607 |

(Continued)

FOREIGN PATENT DOCUMENTS

| | | |
|---|---|---|
| CA | 2054074 C | 1/1996 |
| CA | 2117020 C | 9/2004 |
| EP | 0385245 | 9/1990 |

(Continued)

OTHER PUBLICATIONS

Bosch, Robert, "GSH 5030: High–performance multi–bag packer, output of up to 180 bags per minute, independent of the pack pattern", Bosch Information Leaflet.

(Continued)

Primary Examiner—Gene O. Crawford
(74) Attorney, Agent, or Firm—Wong, Cabello, Lutsch, Rutherford & Brucculeri, L.L.P.

(57) ABSTRACT

A chute system for selectively moving articles with little to no damage to such articles from a supply source oriented at a first level to a transversely moving conveying system oriented at a second lower level. The chute system includes a powered conveyor belt adapted for advancement of the conveyor belt at a known velocity and a guide operatively associated with the conveyor belt and adapted to shape the conveyor belt in a selected arcuate configuration to accommodate and facilitate translation of motion of such an article on the belt from a substantially vertical direction to a substantially horizontal direction. In a preferred embodiment the chute system includes a stop member to provide a stop for such articles upon movement of such articles from the conveyor belt to such conveying system in order to accommodate selective lateral deposition of such articles onto such conveying system.

4 Claims, 7 Drawing Sheets

U.S. PATENT DOCUMENTS

| | | | |
|---|---|---|---|
| 3,729,085 A | | 4/1973 | Schlueter et al. |
| 3,736,997 A | | 6/1973 | Bottorf |
| 3,778,965 A | | 12/1973 | O'Lenick et al. |
| 3,783,584 A | | 1/1974 | Rauser |
| 3,914,919 A | | 10/1975 | Boissy et al. |
| 3,955,665 A | | 5/1976 | Pettis |
| 3,974,888 A | | 8/1976 | Murakami et al. |
| 4,113,124 A | | 9/1978 | Muntjanoff |
| 4,135,346 A | | 1/1979 | Rebsamen |
| 4,135,616 A | | 1/1979 | Pellaton |
| 4,137,977 A | | 2/1979 | Alger |
| 4,295,774 A | * | 10/1981 | Manini et al. ............... 198/607 |
| 4,344,493 A | | 8/1982 | Salmonsen |
| 4,356,906 A | | 11/1982 | Fallas |
| 4,398,383 A | | 8/1983 | Prakken |
| 4,407,107 A | | 10/1983 | Smith |
| 4,457,422 A | * | 7/1984 | Hurd ........................... 198/604 |
| 4,514,963 A | | 5/1985 | Bruno |
| 4,583,351 A | | 4/1986 | Fallas |
| 4,660,352 A | | 4/1987 | Deines et al. |
| 4,768,328 A | | 9/1988 | Mims |
| 4,781,011 A | | 11/1988 | Prakken |
| 4,846,336 A | | 7/1989 | Hoyland et al. |
| 4,864,801 A | | 9/1989 | Fallas |
| 4,867,299 A | | 9/1989 | Fukuoka et al. |
| 4,901,808 A | | 2/1990 | Wu |
| 4,991,708 A | | 2/1991 | Francioni |
| 5,088,569 A | | 2/1992 | Checcucci |
| 5,123,231 A | | 6/1992 | Fallas et al. |
| 5,172,800 A | | 12/1992 | Brown et al. |
| 5,186,306 A | | 2/1993 | Sjostrand |
| 5,197,584 A | | 3/1993 | Powell et al. |
| 5,244,100 A | | 9/1993 | Regier |
| 5,306,877 A | | 4/1994 | Tas |
| 5,308,930 A | | 5/1994 | Tokutu et al. |
| 5,326,218 A | | 7/1994 | Fallas |
| 5,369,222 A | | 11/1994 | Strelioff |
| 5,383,561 A | | 1/1995 | Tokutu |
| 5,415,267 A | | 5/1995 | Sato et al. |
| 5,692,593 A | | 12/1997 | Ueno et al. |
| 5,966,900 A | | 10/1999 | Burford et al. |
| 6,003,284 A | | 12/1999 | Goodman |
| 6,061,996 A | | 5/2000 | Vissers et al. |
| 6,145,649 A | * | 11/2000 | Belanger et al. ............ 198/493 |
| 6,252,181 B1 | | 6/2001 | Fallas |
| 6,540,063 B1 | | 4/2003 | Fallas |

FOREIGN PATENT DOCUMENTS

| | | |
|---|---|---|
| GB | 1103496 | 2/1968 |
| GB | 1363548 | 8/1974 |
| GB | 1412679 | 11/1975 |
| GB | 2218679 A | 11/1989 |
| GB | 2227217 A | 7/1990 |
| GB | 2253826 A | 9/1992 |
| GB | 2275980 A | 9/1994 |
| JP | 55044489 | 3/1980 |

OTHER PUBLICATIONS

Brochure for Fallas (Brand) Model Index 100–Automatic Case Packer for Lay Flat Flexible Bags.
Schubert (Brand) Packaging Robots Brochure.
Hulbritt (Brand) "Flexi Packer" Brochure.
Dyna–Pak (Brand) Case Packers Brochure.
Advertisement for a Salwasser (Brand) Case Loading Machine.
Flyer: Fallas Automatic Case Loader ACL–CP.
Brochure: Fallas "SLA Auto" Case Packer, copyright 1988.
McGraw–Hill Encyclopedia of Science & Technology, 7th Edition, 1992, vol. 10 pp. 98–99; vol. 15 pp. 516–522; vol. 9 pp. 537; vol. 10 pp. 572–576.
Brochure from Sabel Engineering Corporation on a case packer, copyright 1982.
Brochure for Lightning (brand) case packers.

* cited by examiner

CONVEYOR CHUTE

Any references cited hereafter are incorporated by reference to the maximum extent allowable by law. To the extent a reference may not be fully incorporated herein, it is incorporated by reference for background purposes and indicative of the knowledge of one of ordinary skill in the art.

BACKGROUND OF THE INVENTION

1. Field of the Invention

The present invention relates generally to chutes for moving articles. More particularly, it concerns a conveyor chute for selectively moving articles from a substantially vertical line of motion to a substantially horizontal line of motion.

2. Description of Related Art

A common problem in industry is the selective movement and spacing of articles effectively from one location to another. This problem is especially encountered when the source of articles releases the articles from a height in a vertically downward direction using gravity, such as from a vertical bagging machine, for selective placement onto a transversely moving, horizontal conveyor belt. Such an application presents the problems of depositing the article without damaging it and doing so with the desired spacing and orientation. The placement and spacing on a cross conveyor can be important or critical for subsequent automated handling.

One approach that has been used to move articles from a vertical freefall to a cross conveyor is a curved chute such as is shown in FIGS. 1 and 2. The curved chute can be effective to both break the fall of the product and suitably direct it to the horizontal conveyor belt, especially when the conditions yield substantially constant coefficients of friction between the products and the chute. If the coefficient of friction varies, however, such as with frozen products having condensation or with other products for which the coefficient of friction varies with humidity, the differences in friction coefficients can cause products to stick to the chute or move through the chute at differing velocities, resulting in uneven spacing of products. The resulting article spacing inconsistency can cause subsequent product loss or mishandling, especially if subsequent steps are automated.

It has also been observed that a simple chute can be ineffective with articles that have varying coefficients of friction unless those articles are effectively "rolled" down the chute to negate or minimize issues relating to friction. Additionally, because a simple chute moves articles purely through gravitational force, such a chute provides no capability to increase the velocity at which articles exit the chute to control or facilitate the desired spacing.

There appear to exist several examples of article-moving devices of varying degrees of complexity and specialization that move articles from a first level to a second lower level. For example, U.S. Pat. No. 2,788,113, entitled "Conveying Belt for Cigars," discloses a conveyor that includes guide ridges to transversely orient and equally space cigars. The reference, however, does not disclose an apparatus for receiving falling articles as from a vertical bagging machine.

Another device for moving articles is disclosed by U.S. Pat. No. 3,575,276, entitled "Direction Changing in Conveyance Systems." The system disclosed in the '276 patent appears to transfer cigarette-like articles from a first conveyor at a given level to another conveyor that is transverse to the first and at the same level as the first. This reference therefore does not appear to disclose a device that is designed to safely move a vertically falling product to a transversely moving horizontal conveyor.

U.S. Pat. No. 3,319,767, entitled, "Impact Compensating Means for Belt Conveyors," appears to disclose a device designed to work in conjunction with a gravity chute having a final vertical drop or other gravity-based article delivery system. The device of the '767 patent discloses a spring-supported plate positioned under a conveyor belt to resiliently receive articles as they arrive by falling from above. This reference, however, does not appear to disclose a device adapted to provide the selective spacing of articles on a transverse conveyor.

It is therefore desirable to provide a device for moving articles having variable shapes, sizes, and friction coefficients while translating a vertical component of motion to a horizontal component of motion in a manner that precludes or minimizes damage to the article while facilitating consistent selective deposition of the articles upon a transversely moving conveyor.

BRIEF SUMMARY OF THE INVENTION

The present invention provides such a device for selectively moving articles with little or no damage to the articles from a supply source oriented at a first level to a transversely moving conveying system oriented at a second lower level. The invention includes a chute system that comprises a powered conveyor belt adapted to be selectively advanced. The powered conveyor belt includes a guide operatively associated with the conveyor belt to support the conveyor belt and to shape the conveyor belt in a selected concave arcuate configuration to accommodate and facilitate selected translation of motion of products or other articles from a substantially vertical component of motion to a substantially horizontal component of motion. In particular, the motion of the conveyor belt through an arcuate path acts to catch and guide a falling product through the translation of motion from vertical to horizontal. At the same time, because the conveyor belt is powered, it provides a selected velocity to the movement of the product to ensure that the product is deposited onto the transversely moving conveying system with the desired timing and spacing.

In a preferred embodiment of the present invention, the guide for the conveyor belt includes a guide strip for supporting the conveyor belt in order to selectively maintain the desired arcuate configuration of the conveyor belt during operation. The chute system of the present invention thereby provides a moving surface for receipt and handling of falling products and articles wherein the surface has a consistent configuration for ensuring consistent movement of the products onto a transversely moving conveying system.

In another aspect of the present invention, the chute system of the present invention includes a stop member operatively associated and oriented on an opposing side of the transversely moving conveying system from the conveyor belt in order to provide a stop for the products or articles when they are delivered from the conveyor belt onto the transversely moving conveying system. In particular, it has been found that the introduction of additional velocity (to the velocity provided by gravity) will cause certain types of product to have a tendency to overshoot the transversely moving conveying system when they are delivered from the powered conveyor belt. The stop member may therefore be included to ensure proper placement of the articles onto the transversely moving conveying system, with a desired orientation and spacing, when overshoot of the products is possible or likely.

In another preferred aspect of the present invention, the powered conveyor belt comprises a means for selectively advancing the conveyor belt at a selected velocity. The adjustment of the velocity of the powered conveyor belt accommodates adjustment for varying sizes and weights of products in order to facilitate the desired delivery and spacing of product to the transversely moving conveying system.

Notwithstanding the provision of a speed control associated with the powered conveyor belt to select the velocity of the conveyor belt, it is still often desirable to provide a stop member operatively associated and oriented with a conveyor belt on an opposing side of the conveying system from the conveyor belt in order to provide a stop for those articles that are still prone to overshoot the transversely moving conveying system, notwithstanding the adjustment of the velocity of the conveyor belt.

Accordingly, the present invention eliminates the problems encountered in the prior art with the sticking of and resulting irregular spacing of products during handling through the means of a powered chute having an arcuate configuration for receiving and translating the motion of falling articles from a vertical component to a horizontal component at a desired velocity. The provision of such a powered, arcuately-shaped belt provides a smooth translation of motion from the vertical to horizontal in a manner that minimizes or eliminates breakage of product and that accommodates and enables the selective spacing of materials onto a transversely moving conveying system.

These and other advantages of the present invention will be more fully appreciated by the following detailed description of the invention.

BRIEF DESCRIPTION OF THE DRAWINGS

The invention will be further illustrated by reference to the appended drawings that illustrate a particular embodiment of the conveyor chute of the present invention. The following drawings form part of the present specification and are included to further demonstrate certain aspects of the present invention. The figures are not necessarily drawn to scale. The invention may be better understood by reference to one or more of these drawings in combination with the detailed description of specific embodiments presented herein.

DETAILED DESCRIPTION OF PREFERRED EMBODIMENTS

It will be understood that the present invention can be implemented in a number of different ways, within the scope of the claims appended hereto. A presently preferred embodiment of the invention is described below.

Figure 1:
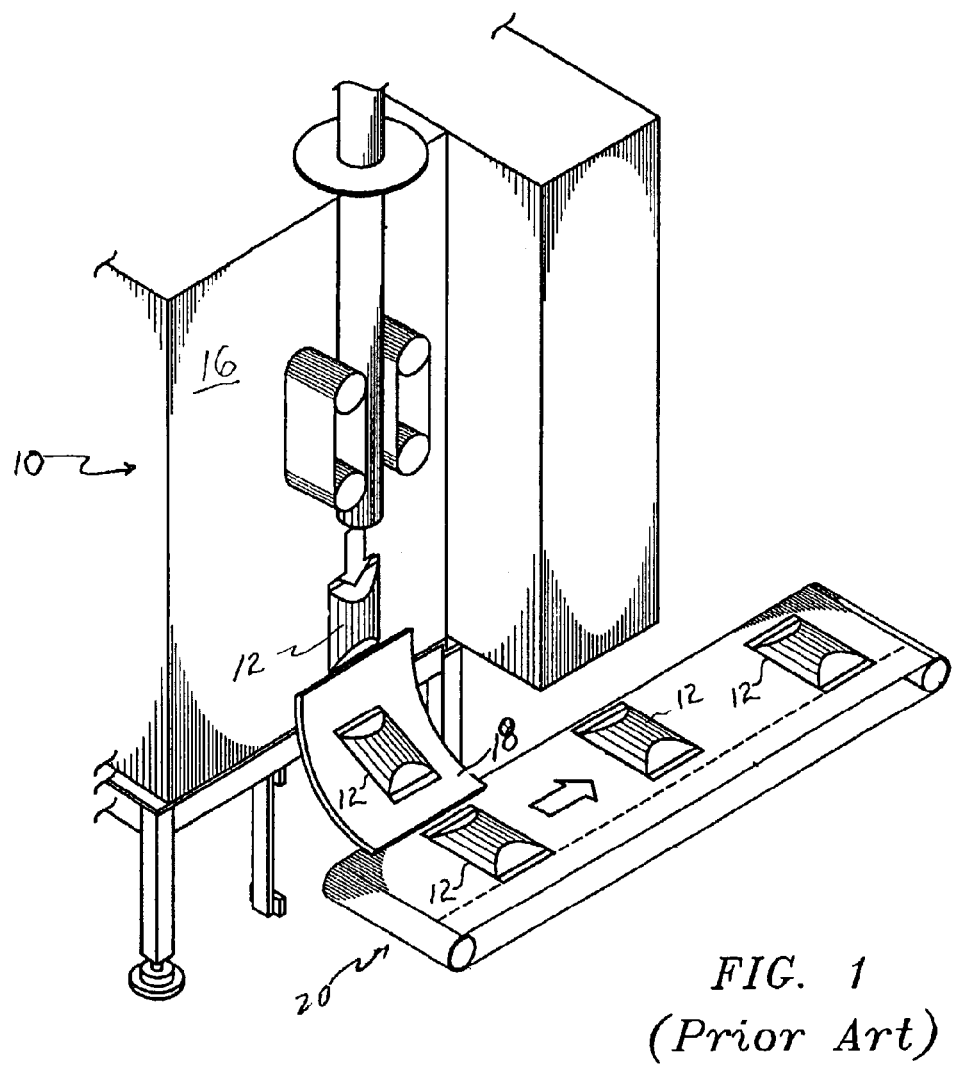
FIG. 1 shows a schematic perspective view of a chute that is believed to be typical of gravity chutes of the prior art.
Figure 2:
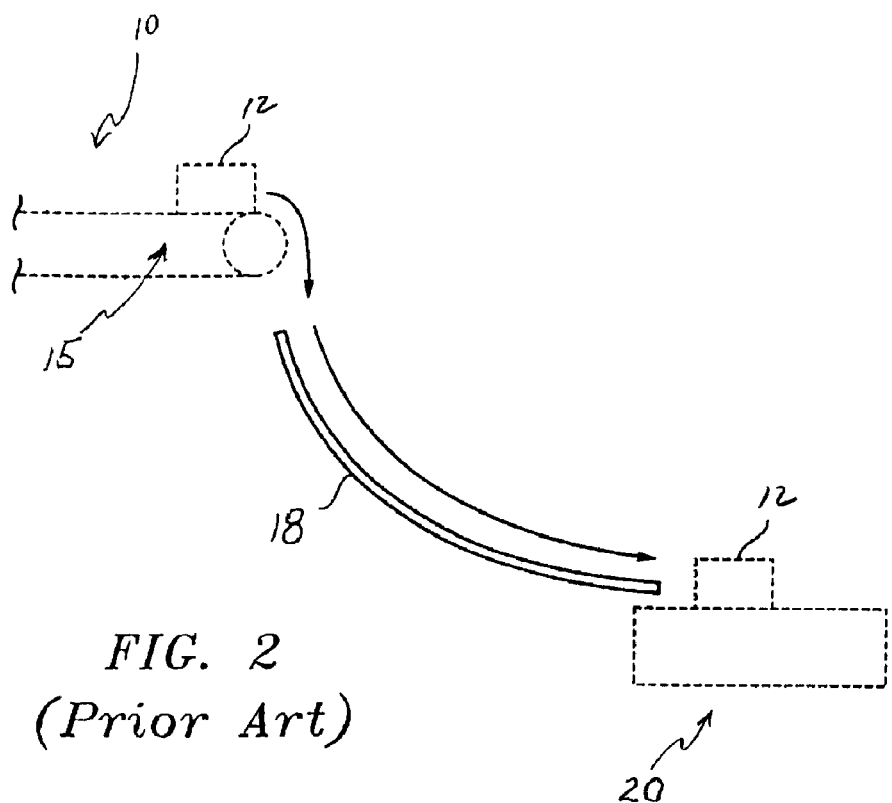
FIG. 2 shows a schematic side view of a chute similar to that shown in FIG. 1.

Referring first to FIGS. 1 and 2, the present invention is intended for use in product-handling systems having a first supply source 10 and a second conveying system 20 in which the first supply source 10 delivers items of product 12 by gravity in a downward vertical motion to the second conveying system 20. The first supply source 10 may comprise any of a number of delivery systems that may be encountered in a product-handling environment. For example, the first supply source 10 may comprise a conveyor belt 15 that is shown in dotted lines in FIG. 2, wherein the conveyor belt 15 simply drops the product 12 off the end of the belt. The first supply source 10 may also be comprised of a bagging machine or similar machine 16 that delivers products through a chute or other drop apparatus toward the second conveying system 20.

A common problem encountered in the prior art is the problem of delivering the products 12 from the first supply source 10, from which it is delivered with a vertical component of motion, onto the second conveying system 20, wherein the product will thereafter have a horizontal component of motion that is transverse to the vertical component of motion provided from the first supply source 10. Because the velocity at which products are provided from the first supply source can be significant, such as with machines having chutes such as the machine 16 shown in FIG. 1, it is often disadvantageous and can cause harm to the product to simply allow the product to drop onto the second conveying system 20. To address this problem, therefore, an arcuate ramp 18 is often used to provide a gradual translation of the motion of the product 12 upon supply from the first supply source 10 from a vertical direction to a horizontal direction as shown in both FIGS. 1 and 2. While such an arcuate ramp may work for ideal environments in which the product is not easily breakable and for which the friction encountered between the product and the arcuate ramp 18 remains relatively constant, there are numerous applications in which such ideal circumstances do not exist. For example, if the product is relatively breakable, the dropping of the product onto even an arcuate ramp 18 can jar the product 12 in a manner that can break the product 12. Additionally, for products such as frozen goods (bagged vegetables), the condensation on the sides of frozen foods can cause the product to stick to the arcuate ramp, thereby impeding or altering the rate of delivery of product traveling down the ramp 18 from the first supply source 10 to the second conveying system 12. This can result in irregularly spaced and irregularly delivered product such as is shown in FIG. 1.

Figure 4:
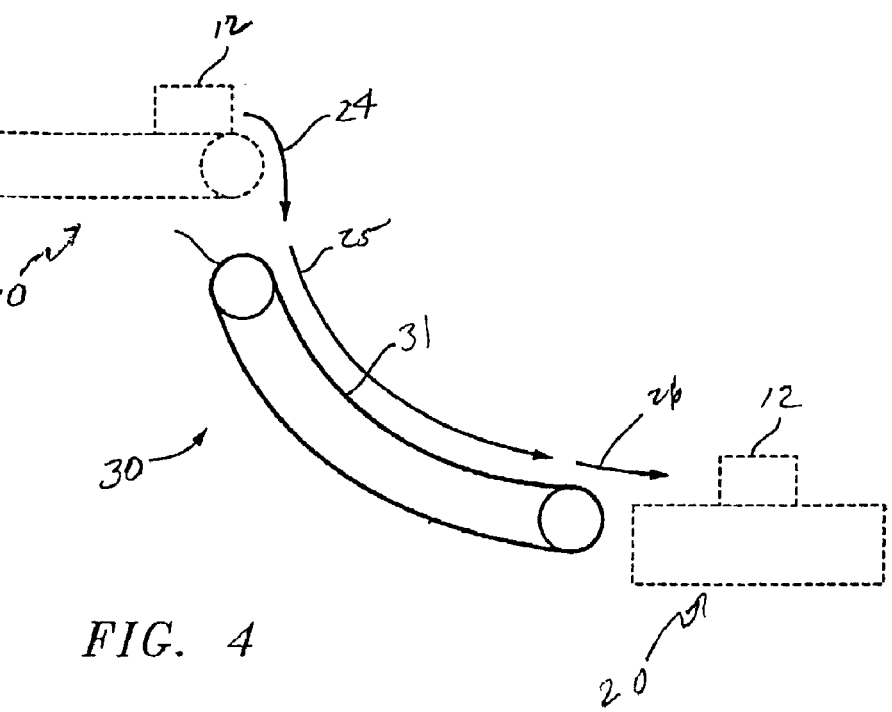
FIG. 4 shows a schematic side view of the conveyor chute of FIG. 3.
Figure 3:
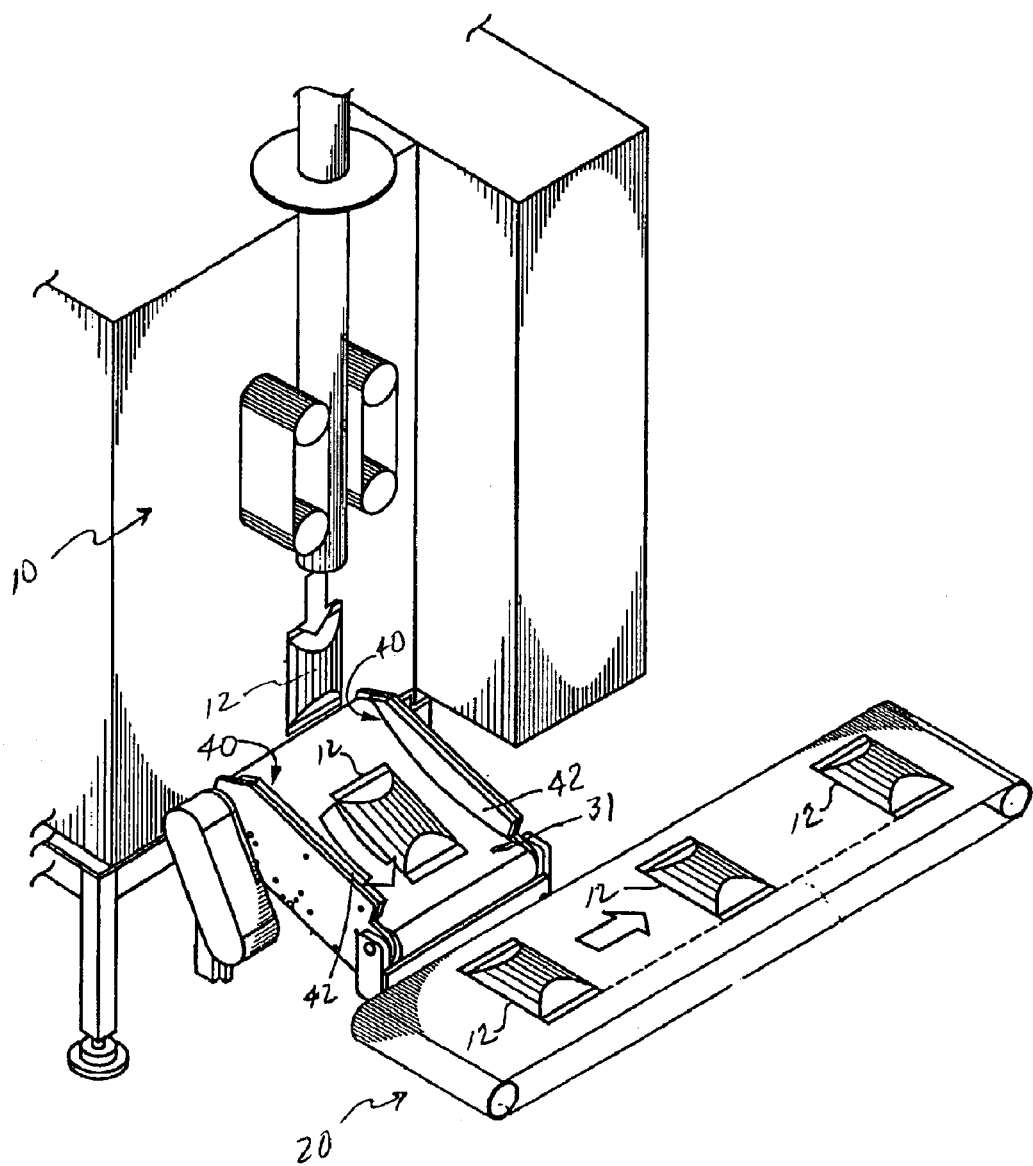
FIG. 3 shows a perspective view of the conveyor chute of the present invention illustrating the transportation of product from a gravity-fed supply source to a transversely moving conveyor system.
Figure 10:
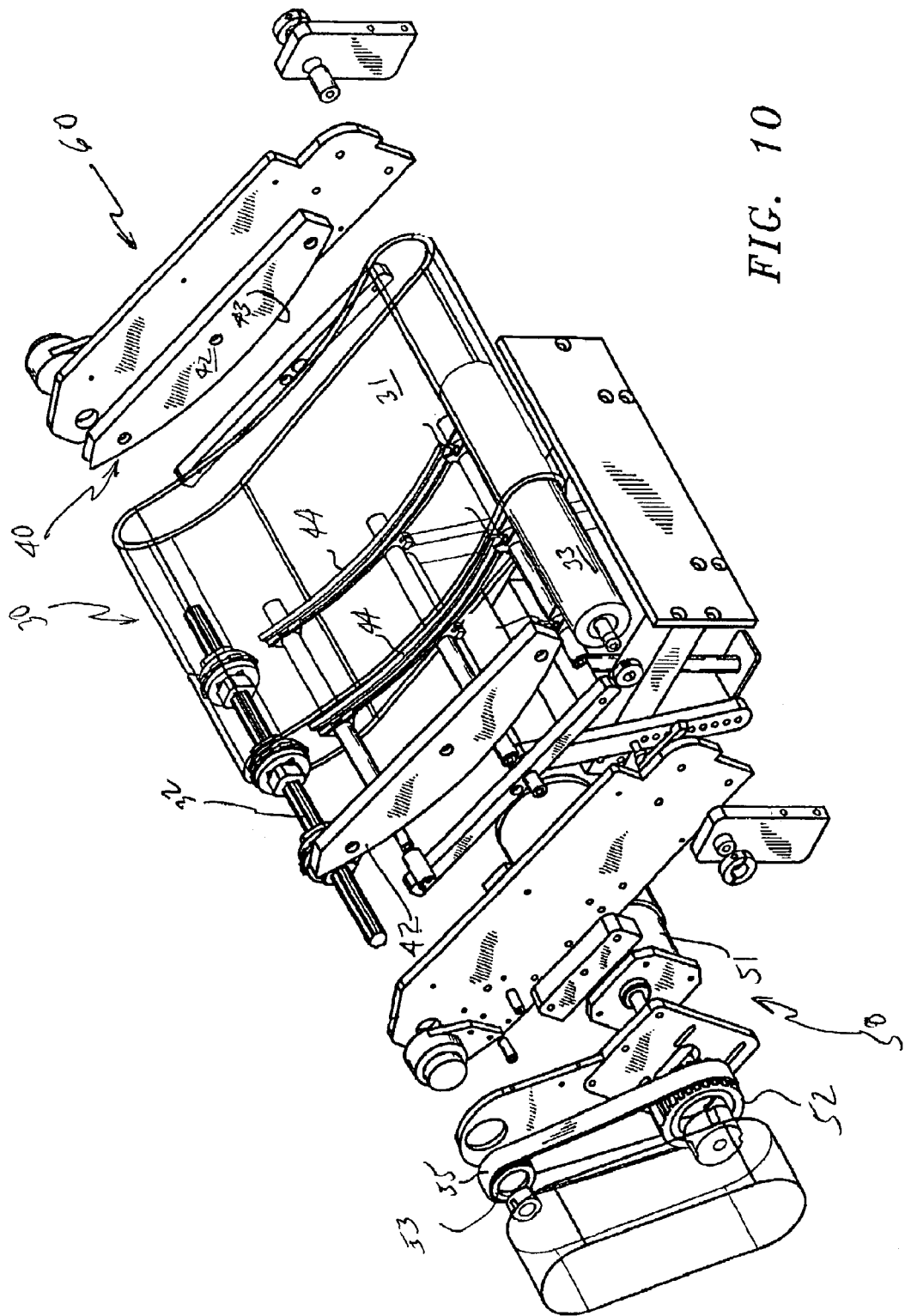
FIG. 10 shows an exploded perspective view of a conveyor chute, in accordance with the present invention.

Referring now to FIGS. 3, 4, and 10, the present invention is generally represented by a conveyor belt 30, conveyor belt guides 40 adapted to support and selectively shape the conveyor belt 30, a conveyor belt drive mechanism 50 operatively associated with the conveyor belt 30 (and its associated rollers), and a support frame 60 adapted to support the conveyor belt 30, the conveyor belt guides 40, and the drive mechanism 50.

The conveyor belt 30 may be comprised of any number of conveyor belt and roller combinations adapted for advancing a conveyor belt upon rotation of a drive roller. In the preferred embodiment, the conveyor belt 30 is comprised of a conveyor belt loop 31 that is looped around a drive roller 32 and an idler or second roller 33 such that rotation of the drive roller 32 acts to advance the conveyor belt loop 31 to advance articles 12 resting on top of the conveyor belt loop 31.

An aspect of the present invention is provided by the guides 40 that shape and retain the conveyor belt loop 31 in a desired arcuate configuration for translating motion of product 12 falling onto the conveyor belt loop 31 from a substantially vertical direction of motion to a substantially horizontal direction of motion. The guides 40 may be comprised of any number of structural members that are configured and oriented to support and hold the conveyor belt loop 31 in the desired orientation or configuration while allowing the desired and unimpeded advancement of the conveyor belt loop 31 during operation. In the preferred embodiment, the guides 40 include top guides 42 that are disposed on top of and at each side of the belt loop 31 to depress the belt loop 31 into the desired arcuate configuration. In particular, the top guides 42 provide a camming lower surface 43 having a desired arcuate path that acts to constrain the conveyor belt loop 31 in the desired, concave, arcuate configuration.

In the preferred embodiment, the guides 40 further include a plurality of base guides (or guide strips) 44 that are disposed inside the conveyor belt loop 31 and below the top surface of the loop 31 in order to provide base support for the middle of the conveyor belt loop 31 during operation. The base guides 44 have an arcuate configuration complementary to the arcuate configuration of the top guides 42 such that the base guides 44 act to retain the top surface of the conveyor belt loop 31 in the desired arcuate configuration as reflected by the shape of the top guides 42.

In the preferred embodiment, the guide 40 includes a pair of top guides 42 located on top of the opposing sides of the belt 31 and a plurality of base guides 44 spaced under the center of the belt loop 31 such that the guides 42 and 44 are adapted to support and shape the top side of the conveyor belt loop 31 in the desired arcuate configuration. It will be appreciated by those of skill in the art in view of the present disclosure, however, that a single guide member could be constructed that incorporates a base guide feature and a top guide feature, and still be within the spirit and scope of the present invention.

Figure 6:
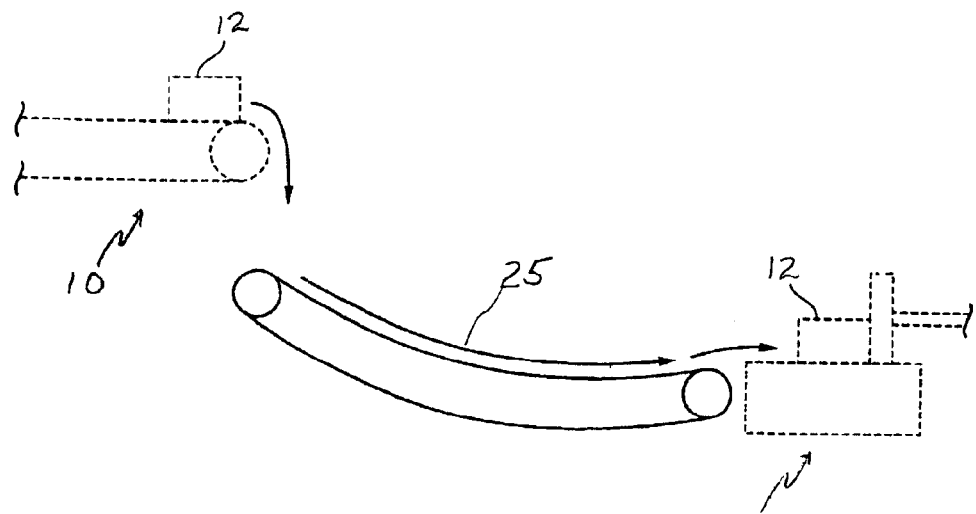
FIG. 6 shows a schematic side view of the conveyor chute of FIG. 4, wherein the conveyor chute is positioned having a different degree of tilt and a different arcuate configuration.
Figure 7:
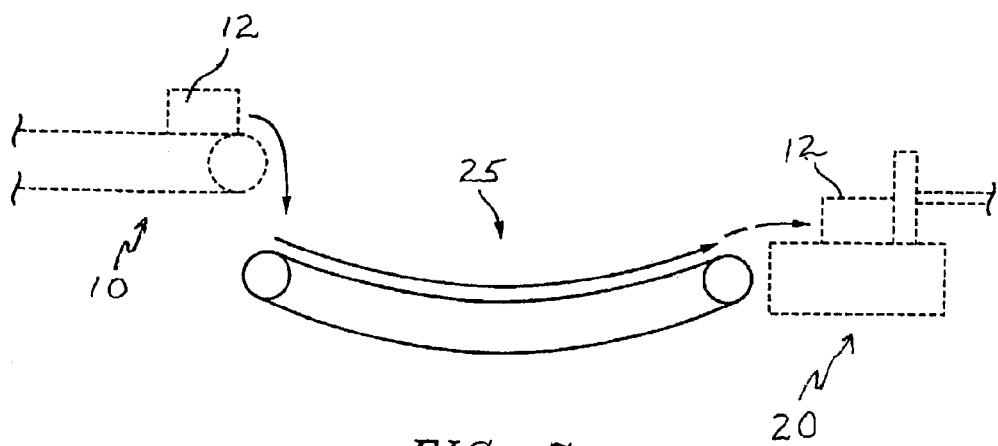
FIG. 7 shows a schematic side view of the conveyor chute of FIG. 4, wherein the conveyor chute is positioned having yet another degree of tilt.
Figure 8:
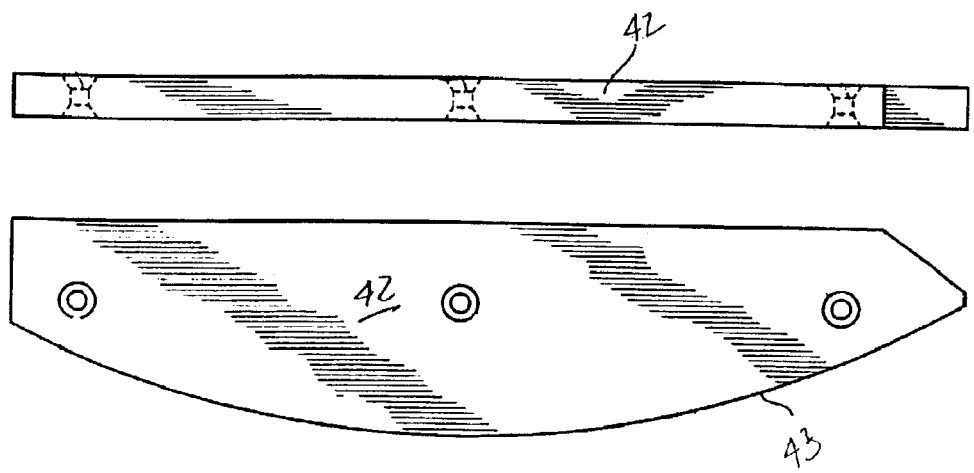
FIG. 8 shows a cam guide in accordance with the present invention.
Figure 9:
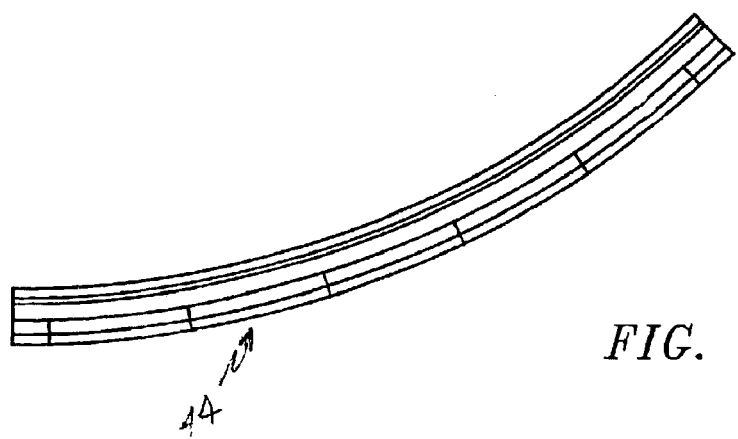
FIG. 9 shows a guide strip in accordance with the present invention.

As discussed above, an aspect of the present invention is the provision of an arcuate shape to the conveyor belt 30 in order to facilitate the translation of the vertical component of motion of products 12 introduced by the delivery of product 12 from the first supply source 10 to a horizontal component of motion for depositing the product on the second conveying system 20 that is generally moving transverse to the vertical direction with which the product 12 is initially introduced. The radius or radii of the arcuate configuration are not necessarily critical to the successful implementation of the spirit and scope of the present invention. Similarly, the number of degrees of a circle or quarter circle encompassed by the arcuate configuration is not critical. (Notice that the arcuate configuration of the conveyor 30 shown in FIG. 3 is not a 90° arc that extends totally from a vertical surface to a horizontal surface.) Rather, the radii, length, and number of degrees may be varied in response to the particular situation and will depend upon the velocity with which the products are delivered, the size of the products, the distance between the first supply source 10 and the second conveying system 20, among other factors. Numerous possible lengths of the conveying loop 31 and numerous possible radii of arcuate curvature could be utilized for a particular application, all within the spirit and scope of the present invention. Similarly, the arcuate conveyor belt 30 may be disposed at different angles or orientations as shown in FIGS. 6 and 7. It is only important that the conveyor belt 30 be powered and have an arcuate, concave configuration and orientation adapted to effectively catch, cradle and move product in order to translate the vertical motion from the first supply source 10 in a non-harmful way to a horizontal motion for delivery to the second transverse conveying system 20.

The present invention also includes a drive mechanism for selectively driving the conveyor belt at a desired velocity. The drive mechanism 50 may comprise any of a number of means for powering the drive shaft or drive roller 32 to selectively advance the conveyor belt loop 31 at the desired velocity. In the preferred embodiment, the drive mechanism 50 includes a gear motor 51 operatively connected to a first timing pulley 52. A second timing pulley 53 is operatively connected to the conveyor drive roller 32. In turn, the first and second timing pulleys 52 and 53 are operatively connected by a drive belt 55 for translating the rotation of the gear motor 51 to the conveyor belt drive roller 32 for selectively advancing the conveyor belt loop 31. As will be appreciated by those of skill in the art, the velocity of rotation may be varied by varying the speed of the gear motor 51, or by varying the size of the respective timing pulleys in order to obtain the desired speed for the conveyor belt loop 31. The exact design of the drive mechanism may be varied within the spirit and scope of the present invention to accomplish the desired result as will be apparent to those of skill in the art based upon the present disclosure.

The conveyor belt 30, the guide 40, and the drive mechanism 50 are all operatively connected to a support frame 60 to maintain the orientation of the respective members in order to provide the desired arcuate configuration of the conveyor belt 30 in operation. The manner of attachment of these parts to the support frame 60 may be accomplished in a number of ways, such as bolts, brads, rivets, etc. The exact manner of assembly will vary depending upon a particular application and will be apparent to those of skill in the art based upon the present disclosure.

Accordingly, referring again to FIGS. 3 and 4, when the conveyor chute of the present invention is utilized, product 12 is dropped from a first supply source 10 onto the conveyor belt loop 31 wherein the movement of the conveyor belt loop 31 acts to translate the vertical component of motion 24 through the arcuate path 25 to produce a substantially horizontal direction of travel 26 as best shown in FIG. 4. Because the velocity of the product 12 can be regulated through the velocity of the powered conveyor chute 30, the velocity of delivery of product 12 onto the transverse conveying system 20 can be substantially regulated so that the timing and spacing of the products 12 onto the second conveying system 20 can be substantially predicted and regulated as shown by the regular spacing in FIG. 3.

Figure 5:
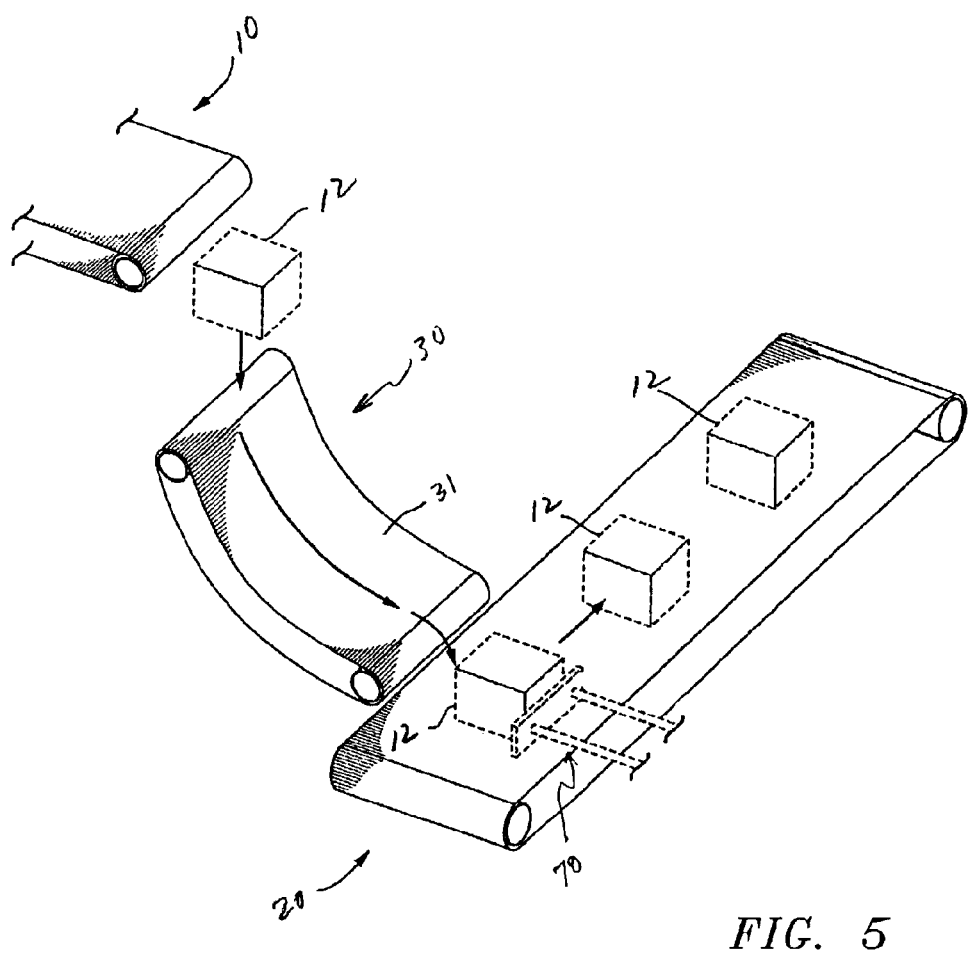
FIG. 5 shows a schematic perspective view of a conveyor chute system of the present invention illustrating schematically a stop member.

Referring now to FIG. 5, the preferred embodiment of the present invention may also include a stop member 70 (shown in dotted lines) for providing a controlled stop and placement of product 12 on the transverse conveying system 20 when it is delivered from the conveyor belt 30. The stop member 70 is generally disposed on the opposing side of the second conveying system 20 and is aligned with the direction of travel of product 12 when it is delivered from the conveyor belt 30 so that the delivery of the product 12 from the conveyor belt 30 will cause the product 12 to travel to and meet the stop member 70 as shown in FIG. 5. The stop member 70 may be comprised of any of a number of shapes and configurations adapted to provide a gentle bumper for products 12 when the products 12 are delivered from the conveyor belt 30. Moreover, the stop member 70 may include springs, shock absorbers, or other means for arresting the motion of the product 12 without harm to the product 12 without harm to the product 12. In the preferred embodiment, the stop member 70 is comprised of a bar that is configured and oriented to provide the desired article placement when product 12 is delivered from the conveyor belt 30.

It will be appreciated from the present disclosure, however, that other stop members 70 may be used for providing the desired article placement. For example, for magnetic metallic products, the stop member may be comprised of a device that generates a magnetic field. For articles having a low density, the stop member may be comprised of an air blower. These and other devices or members for stopping the product 12 when delivered from the conveyor belt 30 are within the spirit and scope of the present invention and will be apparent to those of skill in the art in light of the present disclosure.

The instant invention has been disclosed in connection with this specific embodiment. However, it will be apparent to those skilled in the art that variations from the illustrated embodiment may be undertaken without departing from the spirit and scope of the invention. For example, as discussed above, the stop member 70 may take a number of forms and shapes adapted to provide the desired placement of product on transverse conveyor system 20. As another example, the degree of arcuate curvature could vary along the course of the conveyor chute so as to translate the vertical component of motion into a horizontal component of motion at a varying rate. These and other variations will be apparent to those skilled in the art in view of the above disclosure and are within the spirit and scope of the invention.

As used in this specification and in the appended claims, it should be understood that word "connect" or any derivative thereof implies not only a direct, immediate connection between two recited parts, but also embraces the various arrangements wherein the parts are operatively connected, although other elements may be physically located or eliminated between the connected parts. Further, the word "a" does not preclude the presence of a plurality of elements accomplishing the same function.

What is claimed is:

1. A chute for selectively moving articles with little to no damage to such articles from a supply source oriented at a first level to a transversely moving conveying system oriented at a second lower level, comprising:
    (a) a powered conveyor belt adapted for selective advancement of the conveyor belt;
    (b) a guide operatively associated with the conveyor belt and adapted to shape the conveyor belt in a selected concave arcuate configuration to accommodate and facilitate translation of motion of such an article on the belt from a substantially vertical motion to a substantially horizontal motion; and
    (c) a stop member operatively associated and oriented on an opposing side of the transversely moving conveying system from the conveyor belt to provide a stop for such articles upon movement of such articles from the conveyor belt to such conveying system in order to accommodate selective lateral deposition of such articles onto such conveying system.

2. The chute of claim 1, wherein the guide comprises a guide strip for supporting the conveyor belt in order to selectively maintain the arcuate configuration of the conveyor belt during operation.

3. A chute system for moving articles from a supply source oriented at a first level to a transversely moving conveying system oriented at a second lower level to provide selective spacing of such articles without damage to the articles, comprising:
    (a) a conveyor belt;
    (b) a guide operatively associated with the conveyor belt and adapted to support and shape the conveyor belt in a selected concave arcuate configuration; and
    (c) means for selectively advancing the conveyor belt at a selected velocity; and
    (d) a stop member operatively associated and oriented with the conveyor belt on an opposing side of the conveying system to provide a stop for such articles upon movement of such articles from the conveyor belt to the conveying system in order to accommodate selective lateral deposition of such articles onto such conveying system.

4. A material handling system for products, comprising:
    (a) a supply machine for supplying such products, the products being supplied at a first level by gravity in a substantially vertical direction;
    (d) a conveying system adapted to convey such products upon receipt from the supply machine, the conveying system having a direction of travel for the conveying of such products that is substantially transverse to the substantially vertical direction of travel of the products when supplied from the supply machine, the conveying system further being disposed at a second level lower than the first level; and
    (e) a conveyor chute operatively associated between the supply machine and the conveying system to translate the substantially vertical direction of travel of such products received from the supply machine to a substantially horizontal direction of travel for such products for deposition on the conveying system, the conveyor chute comprising:
        (1) a powered conveyor belt adapted for advancement of the conveyor belt;
        (2) a guide operatively associated with the conveyor belt and adapted to shape the conveyor belt in a selected concave arcuate configuration to accommodate and facilitate translation of motion of such products on the belt from the substantially vertical motion to a substantially horizontal motion; and
        (3) a stop member operatively associated and oriented with the conveyor belt on an opposing side of the conveying system to provide a stop for such articles upon movement of such articles from the conveyor belt to the conveying system in order to accommodate selective lateral deposition of such articles onto such conveying system.

* * * * *